US010029738B2

(12) United States Patent
Andre et al.

(10) Patent No.: US 10,029,738 B2
(45) Date of Patent: Jul. 24, 2018

(54) TURF MAINTENANCE VEHICLE AND SUPPORT PLATFORM ISOLATOR SYSTEM FOR SAME

(71) Applicant: Exmark Manufacturing Company, Incorporated, Beatrice, NE (US)

(72) Inventors: Timothy D. Andre, Firth, NE (US); Jeffrey J. Moore, Beatrice, NE (US); Derek L. Dragoo, Clatonia, NE (US); C. Mark Atterbury, Lincoln, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 10 days.

(21) Appl. No.: 15/164,219

(22) Filed: May 25, 2016

(65) Prior Publication Data

US 2017/0341685 A1    Nov. 30, 2017

(51) Int. Cl.
*B62D 27/04* (2006.01)
*A01D 34/82* (2006.01)
*B62D 25/20* (2006.01)
*A01D 34/64* (2006.01)

(52) U.S. Cl.
CPC ............ *B62D 27/04* (2013.01); *A01D 34/82* (2013.01); *B62D 25/20* (2013.01); *A01D 34/64* (2013.01)

(58) Field of Classification Search
CPC ........ B62D 27/04; B62D 25/20; B62D 51/02; B62D 33/0604; B60G 2300/084; B60G 9/003; B60G 11/15; A01D 34/82; A01D 34/64; A01D 34/001; A01D 2101/00; A01D 34/00; F16F 1/41; F16F 9/483; F16F 2234/04; F16F 15/08; F16F 3/0876
See application file for complete search history.

(56) References Cited

U.S. PATENT DOCUMENTS

| 2,303,567 | A | | 12/1942 | McWhorter et al. |
| 2,538,954 | A | | 1/1951 | Efromson et al. |
| 2,597,800 | A | * | 5/1952 | Hussman ............... F16F 13/00 188/322.5 |
| 2,800,948 | A | | 7/1957 | Omon et al. |
| 2,819,060 | A | * | 1/1958 | Neidhart ............... F16F 1/545 188/129 |
| 2,868,273 | A | | 1/1959 | Barrett |

(Continued)

OTHER PUBLICATIONS

U.S. Appl. No. 14/989,198, filed Jan. 6, 2016, Exmark Manuf. Co., Inc.

(Continued)

*Primary Examiner* — Paul N Dickson
*Assistant Examiner* — Timothy Wilhelm
(74) *Attorney, Agent, or Firm* — Mueting, Raasch & Gebhardt, P.A.

(57) ABSTRACT

A support platform isolator system for a turf maintenance vehicle. The isolator system may include one or more rear isolators, and one or more forward isolators, the isolators positioned between a chassis of the vehicle and a support platform. The isolator system may not only reduce "metal-on-metal" noise between the chassis and the platform, but may also attenuate vibration and/or shock loads transmitted to the platform. In addition, the system may assist in locating the platform on, and retaining the platform to, the chassis. The isolators of the system may form primary contact areas between the chassis and the platform.

9 Claims, 10 Drawing Sheets

(56) References Cited

U.S. PATENT DOCUMENTS

| | | | |
|---|---|---|---|
| 2,900,161 A | 8/1959 | Crede | |
| 2,911,207 A | 11/1959 | Coble, Jr. et al. | |
| 2,987,291 A | 6/1961 | Dyson | |
| 3,177,962 A | 4/1965 | Bailey | |
| 3,305,227 A * | 2/1967 | Henley | F16F 1/422 16/44 |
| 3,368,806 A * | 2/1968 | Szonn | F16F 1/422 267/153 |
| 3,438,672 A * | 4/1969 | Gipp | B62D 33/0604 180/89.1 |
| 3,545,706 A * | 12/1970 | Harshman | B60K 5/06 248/604 |
| 3,732,941 A | 5/1973 | Davis et al. | |
| 3,770,235 A | 11/1973 | Klapproth et al. | |
| 3,913,940 A * | 10/1975 | Bates | B60G 9/04 280/124.101 |
| 3,951,223 A * | 4/1976 | Kamlukin | B60K 5/10 180/11 |
| 4,029,305 A * | 6/1977 | Schubert | B60G 17/052 105/198.1 |
| 4,057,214 A | 11/1977 | Harder, Jr. | |
| 4,062,585 A | 12/1977 | Herring, Jr. | |
| 4,215,841 A | 8/1980 | Herring, Jr. | |
| 4,235,471 A | 11/1980 | Tengler | |
| 4,286,777 A | 9/1981 | Brown | |
| 4,300,332 A * | 11/1981 | Jackson | A01D 34/6806 56/11.3 |
| 4,311,204 A * | 1/1982 | Shupert | B62D 49/0671 180/54.1 |
| 4,477,050 A * | 10/1984 | Thompson | B60N 2/502 248/415 |
| 4,537,382 A | 8/1985 | Beck | |
| 4,711,423 A * | 12/1987 | Popper | F16F 3/0873 248/635 |
| 5,118,086 A * | 6/1992 | Stevenson | F16F 1/371 267/141.1 |
| 5,337,543 A * | 8/1994 | Kitamura | A01D 34/68 56/10.8 |
| 5,356,110 A * | 10/1994 | Eddy | F16F 15/0275 108/136 |
| 5,367,864 A | 11/1994 | Ogasawara et al. | |
| 5,380,036 A * | 1/1995 | Perkins | B60G 7/00 280/124.106 |
| 5,579,859 A * | 12/1996 | Quellhorst | B62D 33/0604 180/89.13 |
| 5,769,492 A | 6/1998 | Jensen | |
| 5,876,106 A * | 3/1999 | Kordecki | G01D 5/165 200/314 |
| 5,906,257 A * | 5/1999 | Mizukami | F16D 13/585 192/70.27 |
| 5,915,662 A | 6/1999 | Itakura et al. | |
| 5,984,031 A * | 11/1999 | Velke | A01D 34/001 180/19.3 |
| 6,019,422 A | 2/2000 | Taormino et al. | |
| 6,042,093 A * | 3/2000 | Garelick | B63B 17/0081 114/363 |
| 6,572,071 B1 | 6/2003 | Tsai | |
| 6,669,293 B2 | 12/2003 | Moore | |
| 6,688,689 B1 | 2/2004 | Thorn | |
| 6,719,258 B2 | 4/2004 | Bryngelson et al. | |
| 6,742,619 B2 * | 6/2004 | Farbotnik | B62D 24/02 180/299 |
| 6,773,049 B2 * | 8/2004 | Rupiper | B60N 2/06 296/63 |
| 6,782,964 B1 * | 8/2004 | Korthals | B62D 51/02 180/273 |
| 6,857,254 B2 * | 2/2005 | Melone | A01D 34/64 56/15.8 |
| 6,866,340 B1 | 3/2005 | Robertshaw | |
| 6,988,703 B2 | 1/2006 | Ropp | |
| 7,174,976 B2 * | 2/2007 | Kamen | A63C 17/01 180/19.1 |
| 7,316,389 B2 * | 1/2008 | Rawson | F16F 1/3732 267/141.5 |
| 7,712,751 B2 * | 5/2010 | Beal | A01D 34/001 172/257 |
| 7,735,280 B2 * | 6/2010 | Valentine | E04F 15/225 248/632 |
| 7,785,054 B2 * | 8/2010 | Parisi | B60R 11/00 296/35.1 |
| 7,882,914 B2 * | 2/2011 | Scheele | A01D 34/82 180/89.14 |
| 7,967,282 B2 | 6/2011 | Boyd et al. | |
| 8,016,067 B2 * | 9/2011 | Horgas | F16F 15/08 180/232 |
| 8,141,886 B1 * | 3/2012 | Sugden | A01D 34/82 280/291 |
| 8,146,899 B2 * | 4/2012 | Hiser | B60N 2/38 248/636 |
| 8,186,475 B2 | 5/2012 | Sugden et al. | |
| 8,186,716 B2 * | 5/2012 | Connolly | B62D 25/20 280/759 |
| 8,264,837 B2 * | 9/2012 | Pakula | G06F 1/1626 220/4.02 |
| 8,397,367 B2 * | 3/2013 | Melone | A01D 34/64 29/428 |
| D700,112 S * | 2/2014 | Noble | D12/160 |
| 8,720,937 B2 * | 5/2014 | Noble | F16F 1/373 267/140 |
| 9,057,415 B1 * | 6/2015 | Plangetis | F16F 1/40 |
| 9,161,490 B2 * | 10/2015 | Melone | B60G 9/00 |
| 9,499,204 B1 | 11/2016 | Gust et al. | |
| 2005/0127725 A1 * | 6/2005 | Satani | B60N 2/305 297/188.08 |
| 2005/0279910 A1 | 12/2005 | Huprikar et al. | |
| 2012/0049039 A1 * | 3/2012 | Scheffler | A01D 34/82 248/636 |
| 2016/0244110 A1 * | 8/2016 | Lohmann | B62D 51/005 |

OTHER PUBLICATIONS

"Grasshopper 620T OPS (Operator Protective Structure) and Seat Assembly." Parts Diagram [online]. The Mower Shop, Inc. 2007 [retrieved Sep. 9, 2015]. Retrieved from the Internet: <URL:www.the-mower-shop-inc.com/620t_2007_ops_seat_assembly.aspx>; 4 pages.

"Bonded Tube Mounts: HR Series." Product Datasheet [online]. Barry Controls [retrieved Apr. 28, 2008]. Retrieved from the Internet: <URL:www.barrycontrols.com/defenseandindustrial/productselectionguide/data/HRSeries.aspx>; 1 page.

"A Better Way—Rebound and Terrain Jockey." Unknown publisher. Available on or before Mar. 17, 2014, 1 page.

"Scag Power Equipment, Operator's Manual, Freedom Z Models SFZ52-691FS, SFZ52-27BS, SFZ61-730FS, SFZ61-30BS," Scag Power Equipment, Mayville, WI. Sep. 2012, 71 pages.

IDS NPL Document 1, "Bob-Cat ProCat mid-mount Mower," Schiller Grounds Care, Inc., Johnson Creek, WI, USA. Believed available at least as early as 2011; 3 pages.

IDS NPL Document 2, "Toro GM7200 Mid-mount Mower," The Toro Company, Minneapolis, MN, USA. Believed available at least as early as 2014; 1 page.

* cited by examiner

TURF MAINTENANCE VEHICLE AND SUPPORT PLATFORM ISOLATOR SYSTEM FOR SAME

Embodiments of the present disclosure relate generally to isolator systems and, more particularly, to riding turf maintenance vehicles incorporating the same.

BACKGROUND

Riding turf maintenance vehicles such as lawn mowers, fertilizer spreaders/sprayers, and the like are known. Such vehicles may include a chassis supported for movement over a ground surface by ground engaging members such as wheels. During vehicle operation over undulating terrain, various forces may be imparted to the chassis and ultimately be transmitted to the riding operator. While the magnitude and/or duration of such forces may be minimal in some instances, traversal of rough terrain may undesirably expose the operator to repetitive and/or jarring forces. Moreover, vibrations inherent in the operation of the vehicle (e.g., from an engine or cutting deck) may also be transmitted through chassis structure to the operator.

It is known to provide isolator systems that seek to attenuate these forces/vibrations. Such systems may typically be provided between the chassis and: a foot platform (for standing or sitting operators); and/or a seat platform. While effective at reducing forces/vibrations transmitted to the operator, drawbacks remain. For instance, some platforms are partially fixed to the chassis, e.g., by a pivot joint, thereby providing a potential and direct rigid load transmission path from the chassis to the platform.

SUMMARY

Embodiments described herein may provide an isolator system that addresses these and other issues. For example, in one embodiment, a turf maintenance vehicle may be provided that includes: a chassis having a front end and a rear end, the rear end spaced-apart from the front end along a longitudinal axis of the vehicle; and a support platform retained by the chassis, the support platform including a retainer adapted to interlock the support platform with the chassis. The vehicle also includes: an elastomeric forward isolator positioned between the chassis and the support platform, wherein the support platform rests vertically on the forward isolator when the support platform is in a normal operating position; and an elastomeric rear isolator associated with the retainer such that the rear isolator is also positioned between the chassis and the support platform. The forward and rear isolators are adapted to both: locate the support platform relative to the chassis along an axis transverse to the longitudinal axis; and attenuate vibration transmitted from the chassis to the support platform.

In another embodiment, a turf maintenance vehicle is provided that includes: a chassis having a front end and a rear end, the rear end spaced-apart from the front end along a longitudinal axis of the vehicle; and a support platform retained by the chassis. The support platform includes a footrest portion and a floor portion located aft of the footrest portion. Either the chassis or the floor portion includes a tab protruding from the chassis or the floor portion, respectively, and the other of the chassis or the floor portion defines an opening adapted to receive therein the tab when the support platform is joined to the chassis. The vehicle also includes: elastomeric first and second forward isolators positioned between the chassis and the support platform at or near the footrest portion; and an elastomeric rear isolator also positioned between the chassis and the support platform at or near the floor portion, the rear isolator including a grommet positioned along a periphery of the opening.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

Embodiments described and illustrated herein may be directed to elastomeric isolator systems and to turf maintenance vehicles incorporating the same. Isolator systems in accordance with embodiments of the present disclosure may include one or more elastomeric forward isolators and one or more elastomeric rear isolators each operatively located between an operator support platform (e.g., a foot platform) and a chassis of the vehicle. Such forward and rear isolators may be configured to attenuate shock and/or vibrational forces that may otherwise be transmitted from the chassis to the support platform (and thus to the operator). As further explained below, the exemplary isolator system may isolate the support platform from the chassis at each contact location, e.g., the platform may be supported, relative to the chassis, through contact with the front and rear isolators. In some embodiments, the isolator system is configured to allow a forward end of the platform to statically deflect at least 0.25 inches when a typical operator (e.g., an operator weighing 200 pounds-force) stands roughly in the center of a horizontal floor portion the platform.

Figure 1:
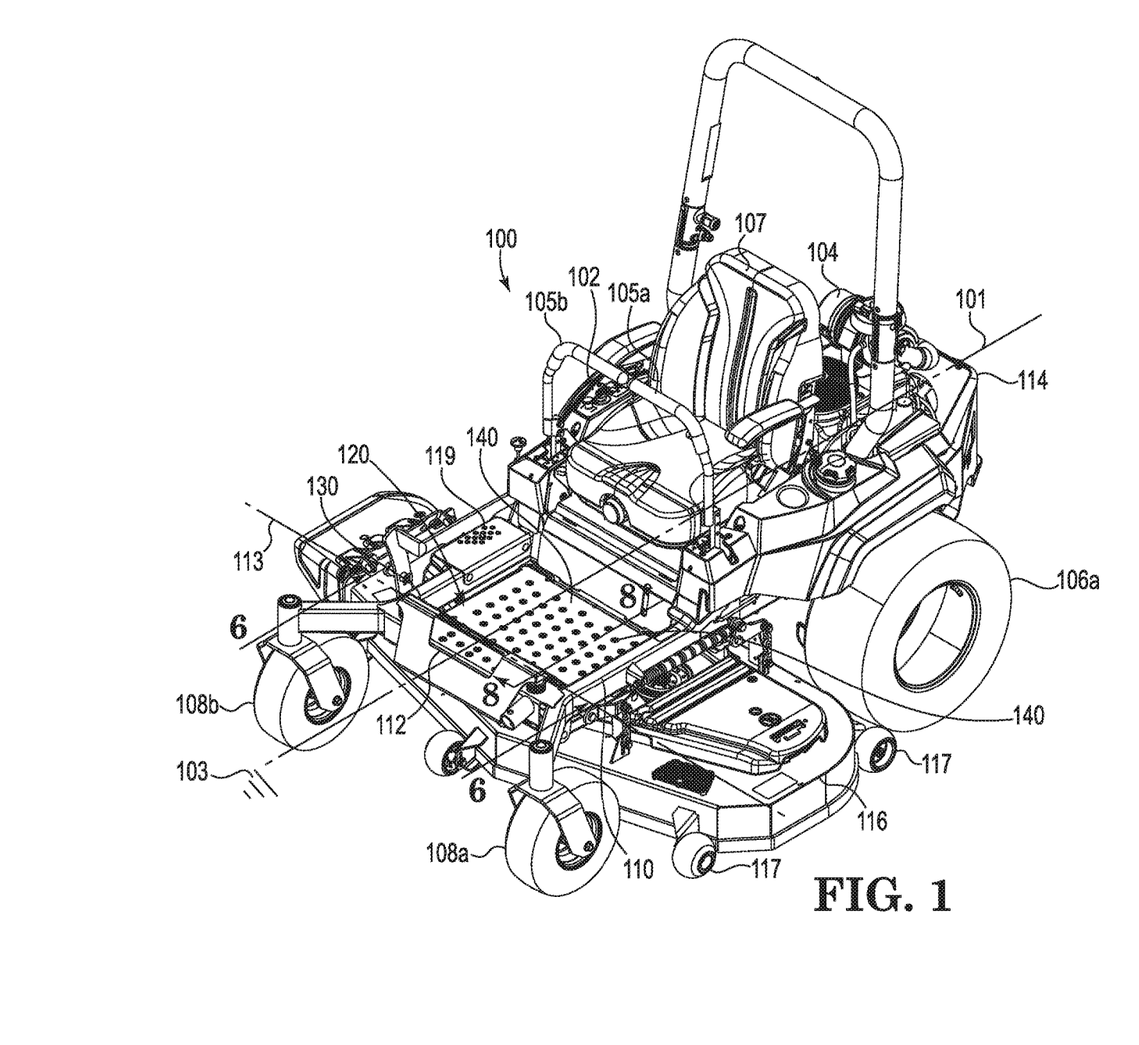
FIG. 1 is a front perspective view of a turf maintenance vehicle (e.g., riding lawn mower) incorporating an isolator system in accordance with embodiments of the present disclosure, the isolator system located between a chassis of the vehicle and an associated operator support platform.

With reference to the figures of the drawing, wherein like reference numerals designate like parts and assemblies throughout the several views, FIG. 1 illustrates a turf maintenance vehicle in accordance with embodiments of the present disclosure. As used herein, a turf maintenance vehicle may include most any self-propelled vehicle adapted to provide a maintenance function to a turf or other ground surface. While shown as a riding, self-propelled, turf maintenance vehicle, e.g., a zero-radius-turning (ZRT) riding lawn mower 100 (also referred to herein simply as a "vehicle" or "mower"), such a configuration is not limiting. That is, while embodiments are described herein with respect to a riding mower, those of skill in the art will realize that embodiments of the present disclosure are equally applicable to other types of riding (e.g., stand-on) turf care products (e.g., aerators, spreader/sprayers, dethatchers, debris management systems (e.g., blowers, vacuums, sweeper, etc.), roto-tillers, and the like).

It is noted that the term "comprises" (and variations thereof) does not have a limiting meaning where this term appears in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the mower 100 while the mower is in an operating configuration, e.g., while the mower 100 is positioned such that wheels 106 and 108 rest upon a generally horizontal ground surface 103 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the other part/feature (e.g., part/feature identified with a "b" suffix). Similarly, the description of a part/feature identified with no suffix may apply, unless noted otherwise, to both the corresponding left and right part/feature.

Although not necessarily central to an understanding of embodiments of the present disclosure, the exemplary mower is now briefly described. FIG. 1 illustrates the mower 100 having a frame or chassis 110 supporting a prime mover, e.g., electric motor or internal combustion engine 104. Left and right ground engaging drive members or wheels 106 (e.g., only left wheel 106a shown, but corresponding right wheel may be a mirror image thereof) may be rotatably coupled to left and right sides, respectively, of a rear portion of the mower 100. The drive wheels 106 may be independently powered by the engine (e.g., via one or more hydraulic motors, transaxles, transmissions, or the equivalent) so that the drive wheels 106 may selectively propel the mower 100 over the ground surface 103 during operation.

Controls, e.g., left and right drive control levers 105 (e.g., 105a, 105b), may also be provided. The drive control levers 105 are generally pivotally coupled to the mower such that they may pivot forwardly and rearwardly (e.g., about an axis transverse to a longitudinal axis 101 of the mower) under the control of an operator sitting on an operator seat 107. The drive control levers 105 are operable to independently control speed and direction of their respective drive wheels 106 via manipulation of the mower's drive system as is known in the art. While illustrated herein as incorporating separate drive control levers 105, other controls, e.g., single or multiple joysticks or joystick-type levers, steering wheels, etc. may also be used without departing from the scope of the disclosure. The mower 100 may further include various other mower controls (power take-off engagement, ignition, throttle, etc.) as indicated by reference numeral 102 in FIG. 1.

In the illustrated embodiment, a pair of front swiveling caster wheels 108 (e.g., left wheel 108a and right wheel 108b) may support a front portion of the mower 100 in rolling engagement with the ground surface 103 during operation. Of course, other drive configurations (e.g., all-wheel-drive, actively steered front and/or rear wheels, tri-wheel configurations) and vehicle using drive members other than wheels (e.g., tracks), are certainly contemplated within the scope of this disclosure.

An implement such as a cutting deck may be attached to the chassis of the mower 100. For example, a lawn mower cutting deck 116 may be mounted to the lower side of the chassis 110 between the drive wheels 106 and the caster wheels 108 (e.g., in what is known as a "mid-mount" configuration). The cutting deck 116 may define an enclosed cutting chamber partially surrounding one or more cutting blades (not shown). Each cutting blade may be attached to a rotatable and powered (e.g., by the engine 104) blade spindle supported by the deck 116. In other embodiments, reel-type cutting elements may be employed. Moreover, while illustrated as a mid-mount deck, other mower configurations may, alternatively or in addition, utilize an out-front or rear (e.g., towed) deck. The cutting deck 116 may optionally include anti-scalp rollers 117 to assist in reducing blade/ground contact.

During operation, power is selectively delivered to the cutting deck 116 (e.g., to the spindle assemblies) and the drive wheels 106, whereby the cutting blades rotate at a speed sufficient to sever grass and other vegetation as the deck passes over the ground surface 103 (e.g., as the mower moves forwardly in a direction parallel to the longitudinal axis 101). Typically, the cutting deck 116 further has an operator-selectable height-of-cut control mechanism 119 to allow deck height adjustment relative to the ground surface 103.

As further shown in FIG. 1, the mower 100 (e.g., the chassis 110) may also include a front end 112 and a rear end 114 spaced-apart from one another along the longitudinal axis 101 of the mower 100. As used herein, "longitudinal axis" refers to an axis 101 of the mower 100 or portion of the mower (e.g., support platform 120) that extends in a direction parallel to the mower's primary operating direction (e.g., front-to-rear). Similarly, "transverse axis" (see, e.g., axis 113 in FIG. 1) refers to any axis that extends horizontally and transversely to the longitudinal axis, i.e., a transverse axis would be any axis normal to a vertical plane containing the longitudinal axis. "Vertical axis" likewise refers to an axis that extends in a vertical direction, i.e., any axis normal to a horizontal plane containing the longitudinal axis. Accordingly, longitudinal direction or distance refers to a direction measured along the longitudinal axis, transverse direction or distance refers to a direction measured along a transverse axis, and vertical direction or distance refers to a direction measured along a vertical axis.

The mower 100 may further include an operator foot support platform 120 that is removably retained by the chassis 110. For example, the support platform 120 may be joined to the chassis 110 such that the support platform 120 is generally held in place, relative to the chassis, during mower operation. However, the support platform 120 may, in some embodiments, be completely removed (i.e., separated) from the chassis 110 to, e.g., service or clean the mower 100. As used herein, the term "removably retained" and its variations refers to the platform 120 being retained and removed from the chassis without the need for tools (e.g., it is not bolted, hinged, screwed, welded, etc. to the chassis). While so illustrated herein, alternative embodiments may use other types of retaining elements that benefit from the use of tools to either attach the support platform to, or remove it from, the chassis 110.

In some embodiments, the support platform 120 may include both a footrest portion 130 and a floor portion 140 located rearwardly from (e.g., aft of) the footrest portion 130. As shown in FIG. 1, the footrest portion 130 is located proximate the front end 112 of the chassis 110 and may extend upwardly and forwardly at an inclination angle relative to the floor portion (see also, e.g., FIG. 4).

The inclination angle of the footrest portion 130 may be selected to allow the operator to comfortably rest his or her feet thereon when the operator is sitting in the seat 107. That is to say, the footrest portion 130 may extend from the floor portion 140 at an inclination angle that provides an ergonomically beneficial rest surface for the operator's feet during operation. Of course, the floor portion 140 may also support the feet of the operator, e.g., during ingress/egress to the seat, when the operator is seated, and/or when the operator is standing on the platform. While shown as including a footrest portion 130, such a configuration is exemplary only. That is to say, the footrest portion 130 of the platform 120 could be excluded in other embodiments.

Figure 2:
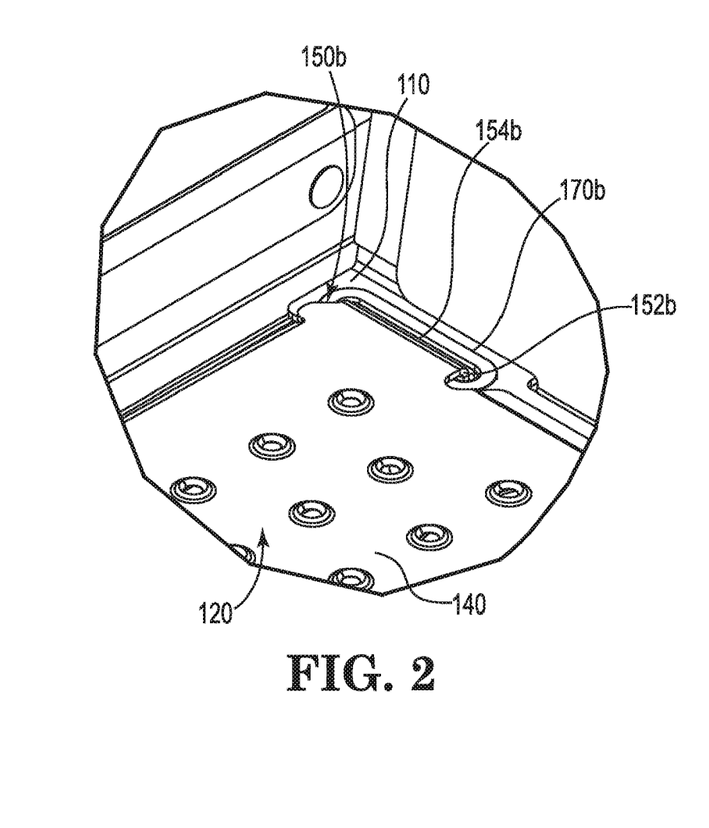
FIG. 2 is an enlarged view of a portion of the support platform of FIG. 1 illustrating an exemplary (e.g., right rear side) elastomeric rear isolator positioned between the chassis and the support platform.

The support platform 120 may further include a retainer configured to join or interlock the support platform with the chassis 110. One exemplary retainer 150 is shown in FIG. 2 (see also FIGS. 4, 8, and 10). As shown in this view, the retainer 150 (e.g., right retainer 150b) may be adapted to interlock with, or otherwise retain or attach the support platform 120 to, the chassis 110. While the retainer 150 may be provided at various locations on the support platform 120, it is, in one embodiment, located at or near a rear side of the floor portion 140 as indicated in FIG. 2. While not wishing to be bound to any specific embodiment, the retainer 150 may form at least one protruding tab 152 (see also FIG. 4) received by a corresponding opening 154 formed in the chassis 110 when the support platform 120 is joined to the chassis. Alternatively, the tab could be associated with the chassis, and the opening with the platform, without departing from the scope of this disclosure.

Figure 4:
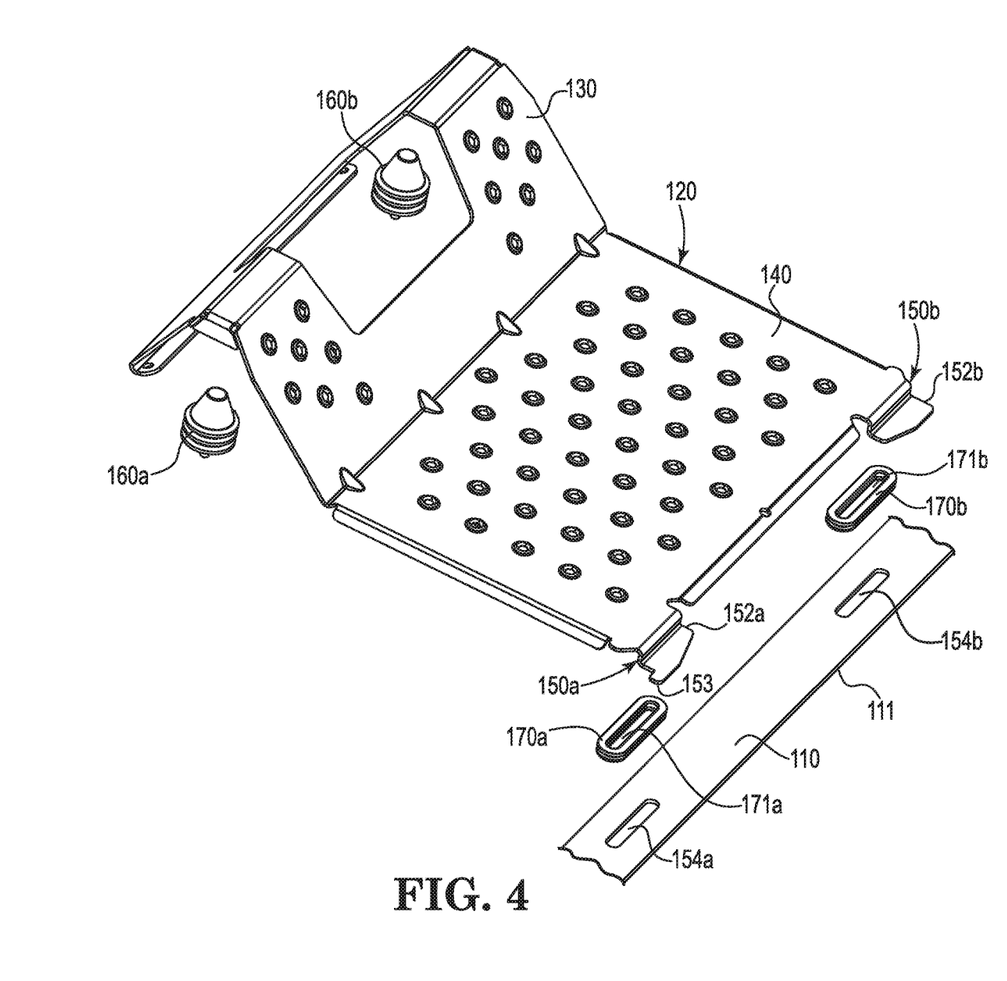
FIG. 4 is an isolated and exploded view of the support platform and the forward and rear isolators in accordance with one embodiment of the disclosure.

As shown in FIG. 4, two retainers 150 may be provided, wherein each retainer includes a protrusion or tab 152 (152a, 152b) that is received in a corresponding opening (e.g., "slots") 154 (154a, 154b) formed in the chassis 110. The two tabs 152 may be spaced-apart in a transverse direction from one another, e.g., the tabs may be located at or near left and right rearmost corners of the platform 120 and may extend outwardly from a rear portion of the platform as illustrated. While shown as using two tabs/openings, other embodiments of the retainer may use a single tab/opening, or three or more tabs/openings. Moreover, the term "tab" is understood herein to include not only flat members, but most any protrusion that can be interlocked with a corresponding opening. Accordingly, the tab may take the form of, for example, a shaped cylindrical member that is received within a circular opening.

As shown in FIGS. 2 and 4, an elastomeric rear isolator 170 (170a, 170b) may be positioned between the chassis 110 and the support platform 120 (see also FIG. 10) when the support platform 120 is retained by the chassis 110 and in a normal operating position as shown in FIG. 1 (note that the tabs 152 allow the platform 120 to move from the normal operating position to a service position (not shown) by raising a front portion of the platform upwardly while the tabs 152 remain retained by the chassis). While the number of rear isolators may vary from one to many, it is contemplated that there will be an isolator associated with each tab 152/opening 154 (e.g., two isolators including a first or left rear isolator 170a and a second or right rear isolator 170b). In such a configuration, the two rear isolators 170 may be transversely spaced-apart from one another such that there is a rear isolator located at or near each of the left and right corners of the floor portion 140 to correspond with the locations of the tabs 152.

In some embodiments, each of the rear isolators 170 may include an elastomeric grommet that extends about and along a periphery of the opening 154 as further described below. As a result, each rear isolator 170 (170a, 170b) also defines an opening or slot 171 (171a, 171b) that corresponds with the respective openings 154 (154a, 154b) formed in the chassis 110. That is to say, when the isolators 170 are attached to the chassis, the respective openings 171 and 154 are coincident (e.g., the major (and minor) axis of each opening 171 is congruent with the major (and minor) axis of the corresponding opening 154). As a result, and in order to simplify the remaining description, the term "opening 154" is understood to include not only the opening formed in the chassis 110, but also that formed by the associated rear isolator 170.

Figure 3:
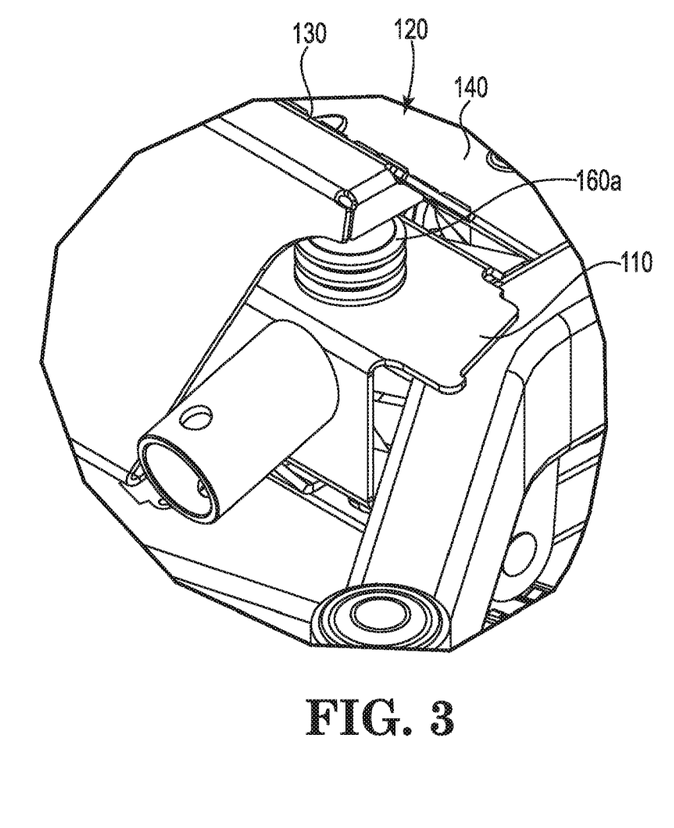
FIG. 3 is an enlarged view of a portion of the support platform of FIG. 1 illustrating an exemplary (left front side) elastomeric forward isolator also positioned between the chassis and the support platform.
Figure 5:
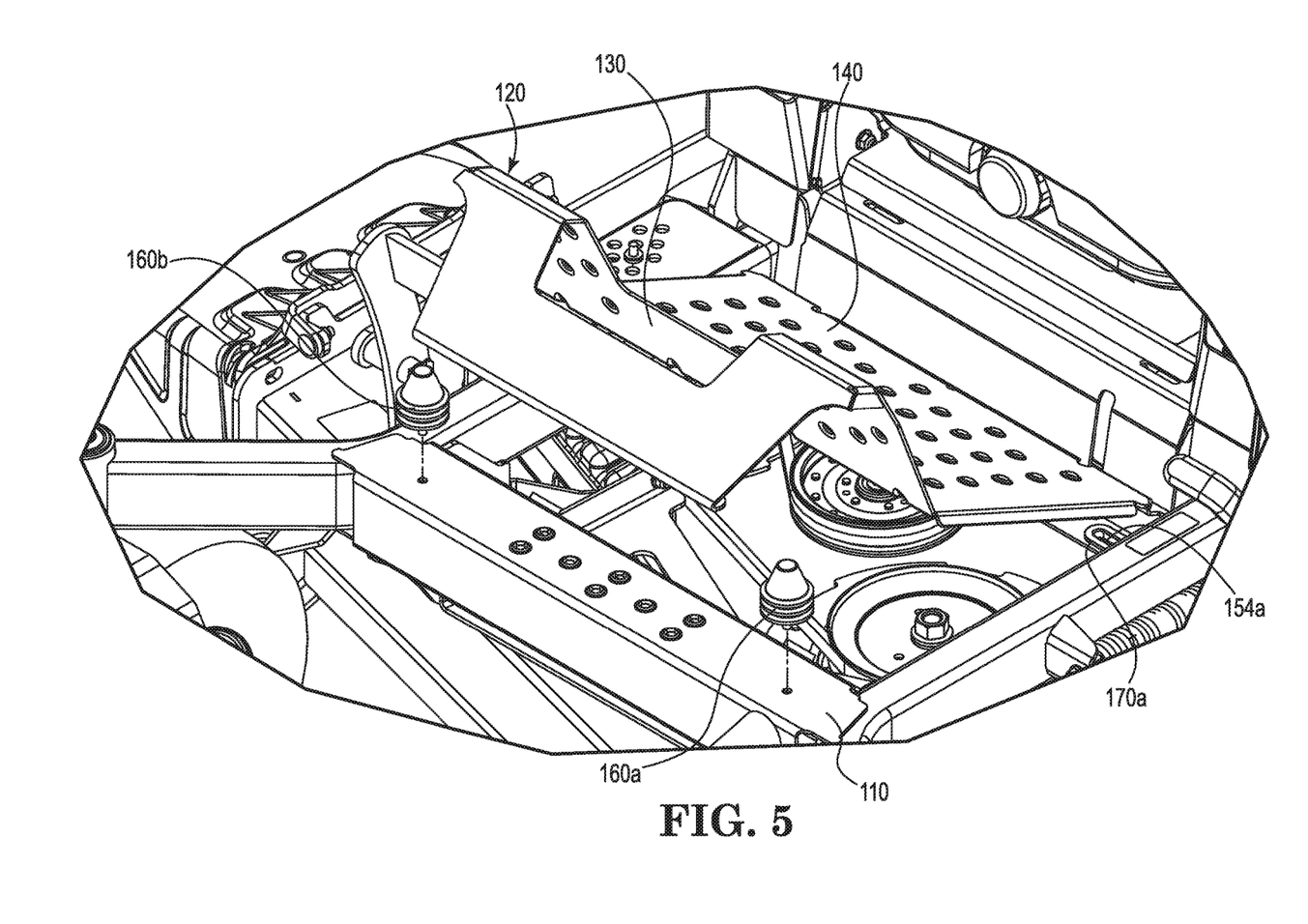
FIG. 5 is an exploded view of the support platform with two forward isolators shown exploded from the chassis of the vehicle of FIG. 1.

In addition to the rear isolators, the mower 100 may also include one or more elastomeric forward isolators 160 (e.g., first or left isolator 160a and second or right isolator 160b). Like the rear isolators 170, the forward isolators are also positioned between the chassis 110 and the support platform 120 when the latter is retained by the chassis and in the normal operating position shown in FIGS. 1 and 3. While the forward isolators could be positioned at various locations along the support platform, they are, in one embodiment, located at or near the footrest portion 130, e.g., at or near a forwardmost end of the footrest portion of the platform 120 (see also FIG. 8). Moreover, the forward isolators 160 may be transversely spaced-apart from one another, e.g., located at or near each of the left and right front corners of the footrest portion 130 of the platform 120 as shown in FIG. 4. As further indicated in FIGS. 4 and 5, each forward isolator 160 may be attached (fastened with a threaded stud) to the chassis 110, after which the footrest portion 130 may rest thereon when the support platform 120 is retained by the chassis and in the normal operating position. While shown using two forward isolators, other embodiments may utilize a single forward isolator or, alternatively, three or more forward isolators.

The elastomeric material of the forward and rear isolators 160, 170 may allow the isolators to attenuate vibration (e.g., from engine and cutting deck operation) and/or operating forces (e.g., from travel over uneven terrain) transmitted through the chassis 110 to the support platform 120 and subsequently, e.g., to the operator. Further, the isolators may reduce or eliminate noise associated with direct "metal-on-metal" contact as may occur with other isolation systems. As further described below, the forward and rear isolators 160, 170 may, in some embodiments, form the sole contact points between the support platform 120 and the chassis 110. In other words, the support platform 120 may rest primarily on the elastomeric isolators and avoid direct "metal-on-metal" contact with the chassis 110.

While not wishing to be bound to any specific material, the forward and rear isolators 160, 170 may be constructed of various elastomeric materials. Moreover, the forward and rear isolators may be made of the same or different material, and/or possess the same or different properties (e.g., load/deflection characteristics, durometers, etc.). Exemplary materials of the forward and rear isolators include, but are not limited to neoprene (55 Shore A), ethylene propylene diene monomer (M-class) rubber (EPDM, 75-85 Shore A), etc.

Because the exemplary support platform is not positively secured to the chassis (e.g., such as it might be when attached by fasteners or a hinge), the forward and rear isolators 160, 170 may also be constructed to assist with locating the platform relative to the chassis 110 when the former is assembled with the latter and placed in the normal operating position of FIG. 1. That is, the forward and rear isolators may assist in locating the platform 120 (e.g., along the longitudinal, transverse, and vertical directions) in the correct position on the chassis, and may further assist in maintaining the correct position during mower operation. Exemplary features of the isolators that may assist with location/alignment of the support platform are now described.

Figure 6:
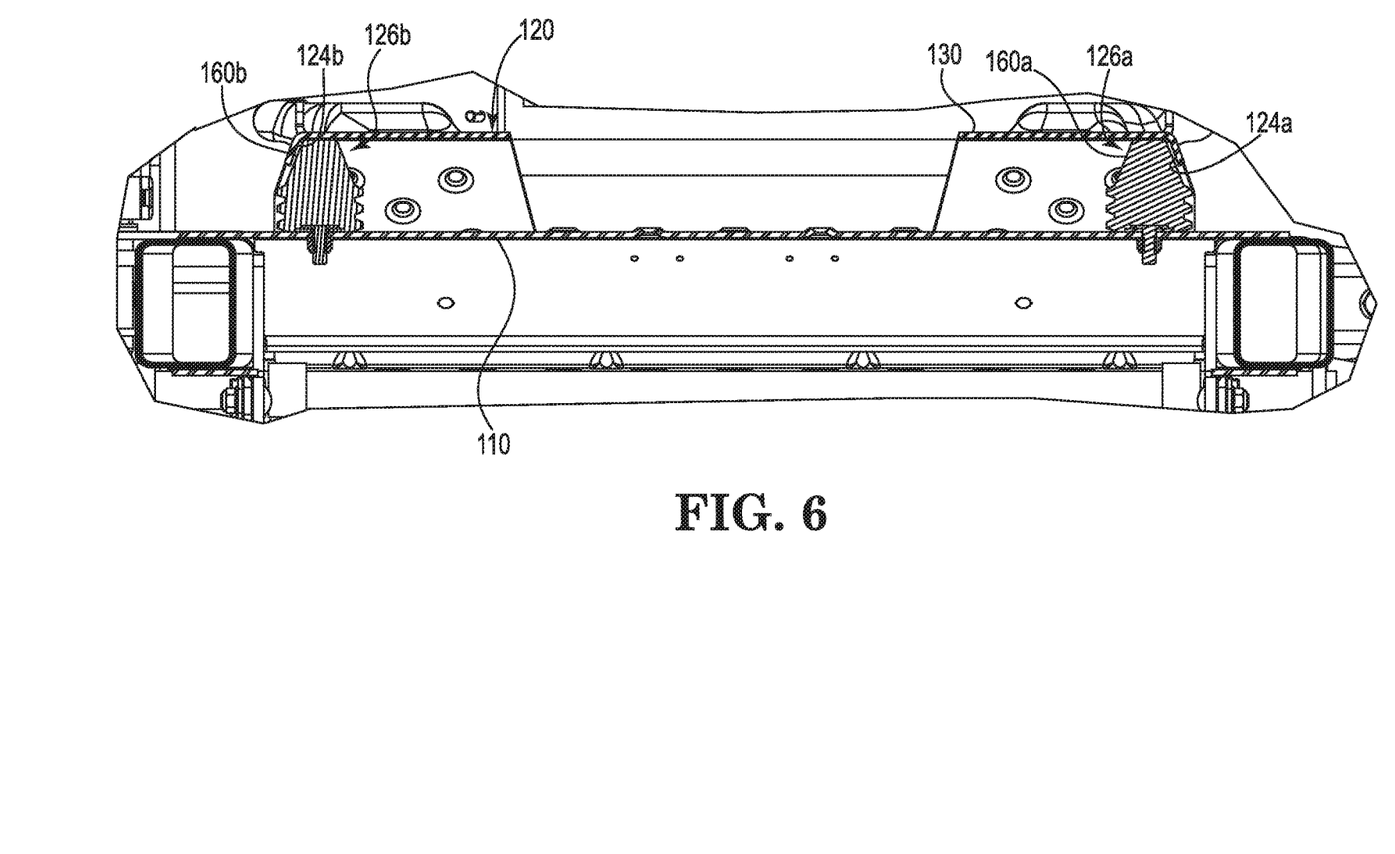
FIG. 6 is a section view taken along line 6-6 of FIG. 1.
Figure 7:
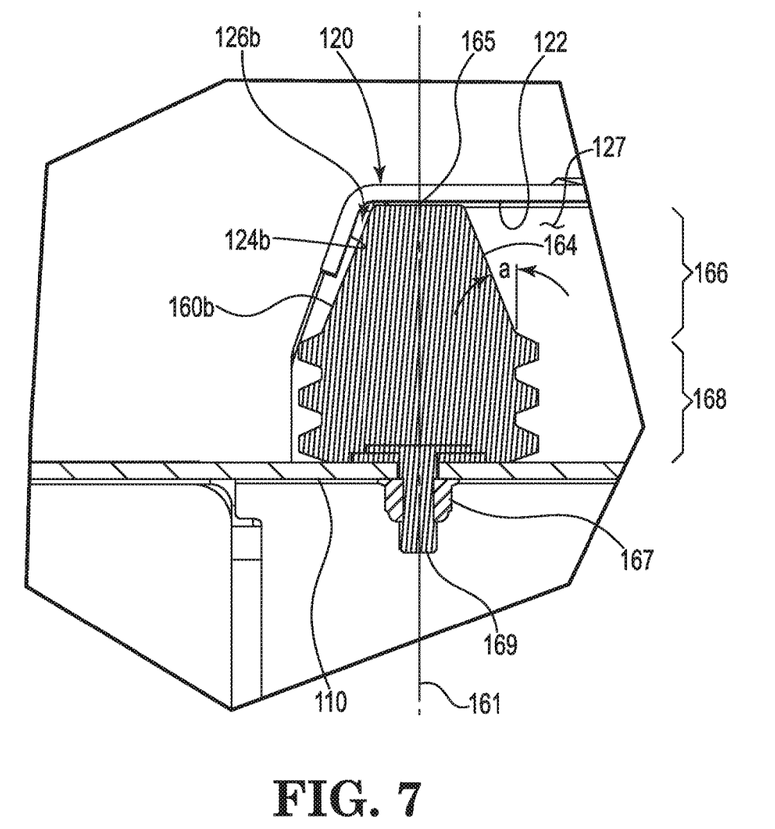
FIG. 7 is an enlarged view of a right forward isolator of FIG. 6.
Figure 11:
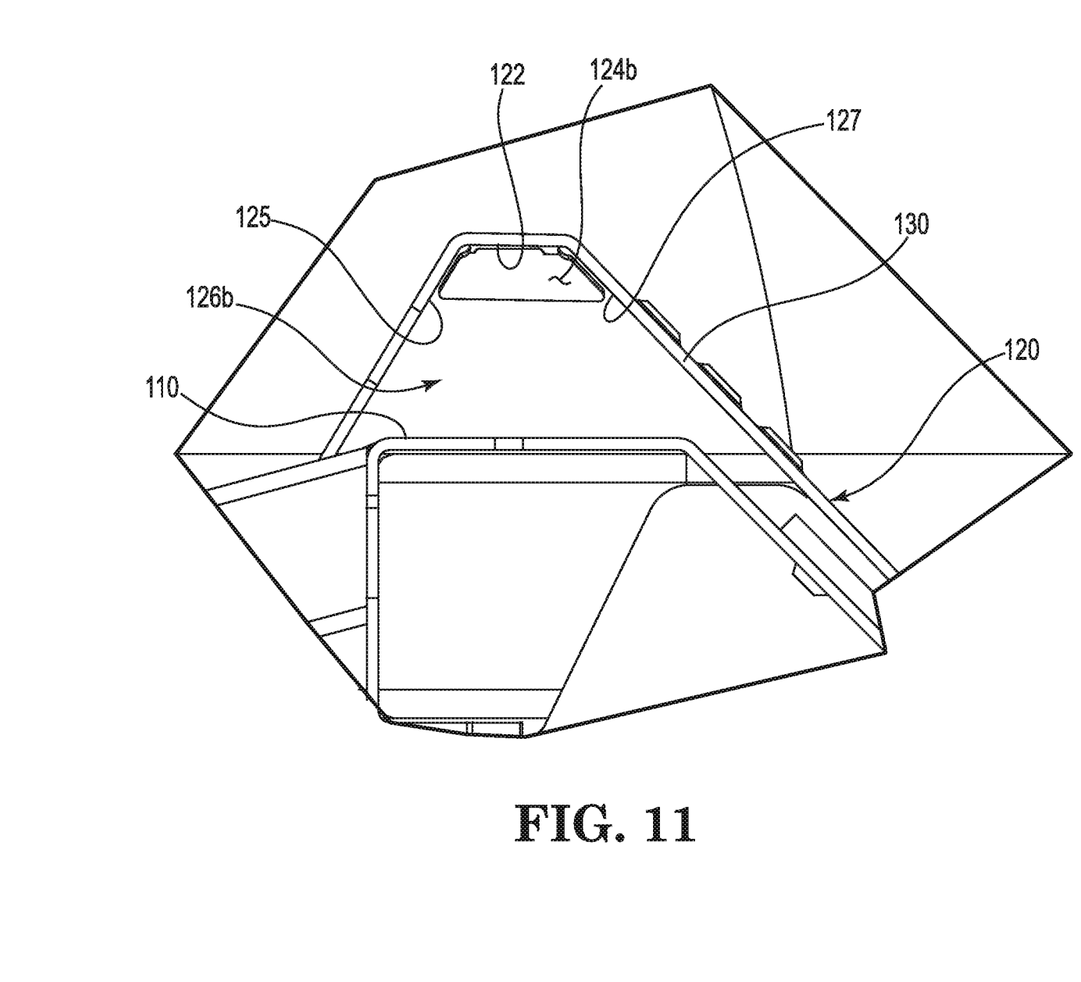
FIG. 11 is a view similar to FIG. 9, but with the forward isolator(s) removed.

FIG. 6 shows a cross section (taken along line 6-6 of FIG. 1) of the left and right forward isolators 160a, 160b (when the support platform 120 is joined to the chassis 110 and in the normal operating position), while FIG. 7 illustrates an enlarged view of a portion, i.e., the right forward isolator 160b, of FIG. 6. As shown in these views, the support platform 120 may define a lower surface 122 and left and right side surfaces 124 (see, e.g., surface 124b in FIG. 7). As further described below (see FIGS. 8, 9 and 11), the lower surface 122 of the support platform 120 may further define front and rear surfaces 125, 127. As a result, the lower surface 122 may be described as forming first and second (e.g., left and right) partially enclosed receivers or pockets 126a, 126b each formed by surfaces 124, 125, and 127 (perhaps best shown in FIG. 11). The receivers 126a, 126b are adapted to receive therein the left and right forward isolators 160a, 160b, respectively, when the support platform 120 is joined to the chassis 110 and in the normal operating position. The receivers 126 may be located at or near the left and right front corners of the footrest portion 130 of the support platform to correspond with the placement of the forward isolators.

In one embodiment (see, e.g., FIG. 7), each of the forward isolators 160 may include an upper isolator portion 166 defining a contact surface 165, and a lower isolator portion 168. The lower isolator portion 168 may be coupled to the chassis 110, e.g., fastened using a stud 169 (integral with the lower isolator portion) and a nut 167. Once each isolator 160 is attached to the chassis, the support platform may be joined to the chassis and placed in the normal operating position wherein the lower surface 122 of the support platform 120 (e.g., of the footrest portion 130) rests vertically upon the contact surface 165 of the upper isolator portion 166 as shown in FIG. 7. Accordingly, the forward isolators 160 are operatively positioned between the chassis and the support platform such that load transmission between the chassis and the support platform is via the forward (and, as described below, the rear) isolators. While shown as attached to or forming part of the chassis 110, the forward and/or rear isolators could alternatively be attached to/part of the support platform without departing from the scope of this disclosure.

In some embodiments, each of the first and second forward isolators 160 may define a vertical isolator axis 161 about which the isolator is rotationally symmetrical. For example, in the illustrated embodiment, each forward isolator has a generally cylindrical and ribbed lower isolator portion 168, and a frustoconical upper isolator portion 166. Such a construction may provide various benefits. For example, the frustoconical upper isolator portion 166 may provide nonlinear vertical deflection such that the forward isolators deflect at a higher rate for initial loads, but become stiffer as the applied load increases.

As illustrated in the figures, the upper isolator portion 166 of each forward isolator 160 may define a frustoconical surface 164 that defines a cone angle "a" with the isolator axis 161 of, e.g., greater than or equal to 10 degrees, greater than or equal to 20 degrees, and greater than or equal to 25 degrees. For instance, in one embodiment, the angle "a" is 22 degrees.

In some embodiments, the side surface 124 (as well as the front and rear surfaces 125, 127 (see FIG. 9)) of the platform generally mimic the localized shape of the frustoconical surface 164. That is to say, the surfaces 124, 125, and 127 may be slightly spaced-apart but generally extend at angles similar, although not necessarily identical, to angle a. As a result of such a construction, the surfaces 124, 125, and 127 may form the receiver 126 that each of the forward isolators 160 may nest within when the support platform 120 is joined to the chassis 110 and in the normal operating position.

As one can appreciate, this nesting relationship between the forward isolators 160 and the surfaces 124, 125, and 127 of the lower surface 122 of the platform 120 may assist with ensuring that the forward portion of the platform is located in the correct position not only in the vertical direction, but also in the fore-and-aft and left-to-right (transverse) directions (i.e., the forward isolators may assist in locating the support platform vertically, longitudinally, and transversely). Moreover, in the event that the support platform shifts during operation in the fore-and-aft or left-to-right directions, the frustoconical surface 164 may contact one of the side, front, or rear surfaces (124, 125, or 127), thereby assisting with maintaining the platform in place while maintaining isolation between the chassis and the platform.

While the exemplary forward isolators are formed with the frustoconical upper isolator portion 166, such a configuration is not limiting. That is, forward isolators having different cross-sectional shapes (e.g., square, rectangular, triangular, trapezoidal, etc.), and/or having different three-dimensional shapes (e.g., cubical, pyramidal, conical, cylindrical, etc.) are certainly contemplated within the scope of this disclosure.

Figure 8:
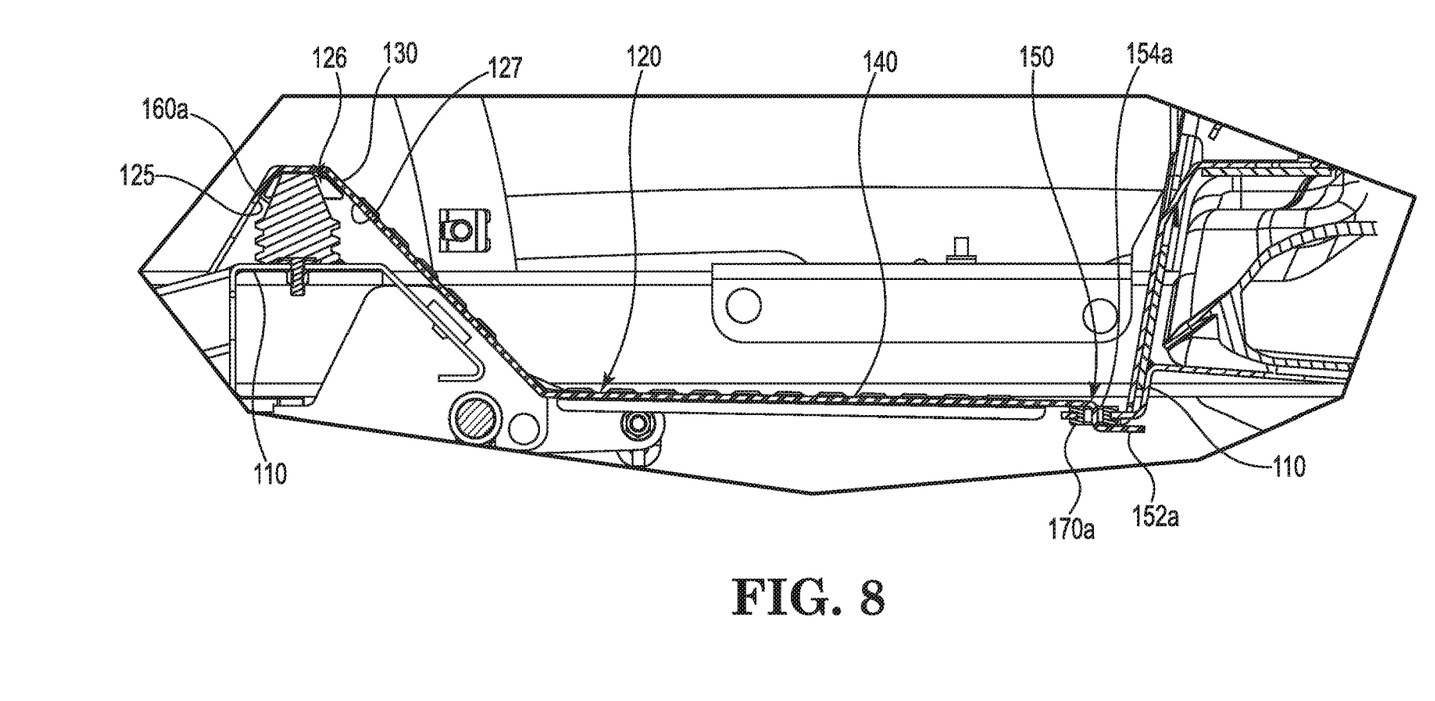
FIG. 8 is a section view taken along line 8-8 of FIG. 1 showing a left forward and a left rear isolator.
Figure 9:
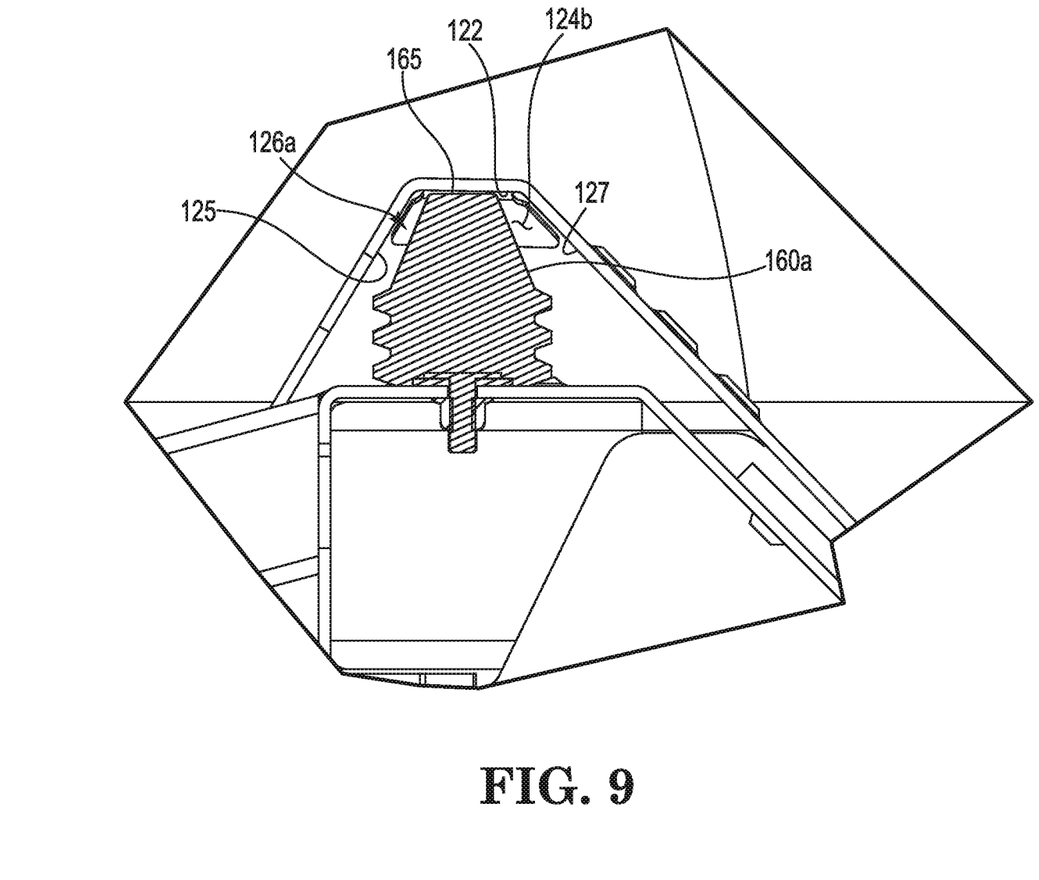
FIG. 9 is an enlarged view of the left forward isolator shown in FIG. 8.

FIG. 8 illustrates a cross section taken along line 8-8 of FIG. 1 through the left forward and left rear isolators (e.g., a section parallel to a vertical plane containing the longitudinal axis 101). In this view, the support platform 120 is shown joined to the chassis 110 and in the normal operating position. Again, as shown in this view and in FIG. 9, the forward isolators 160 (e.g., 160*a*) may nest within their respective pockets 126 (e.g., 126*a*) defined by the side surface 124, the front surface 125, and the rear surface 127. FIG. 8 further illustrates the interaction of the retainer 150 (e.g., tab 152*a*) with the opening 154*a* and the rear isolator 170*a*. As already described herein, the rear isolators 170*a*, 170*b* may, in some embodiments, form a grommet or liner extending about various surfaces associated with the openings 154*a*, 154*b*, respectively, formed in the chassis 110.

Figure 10:
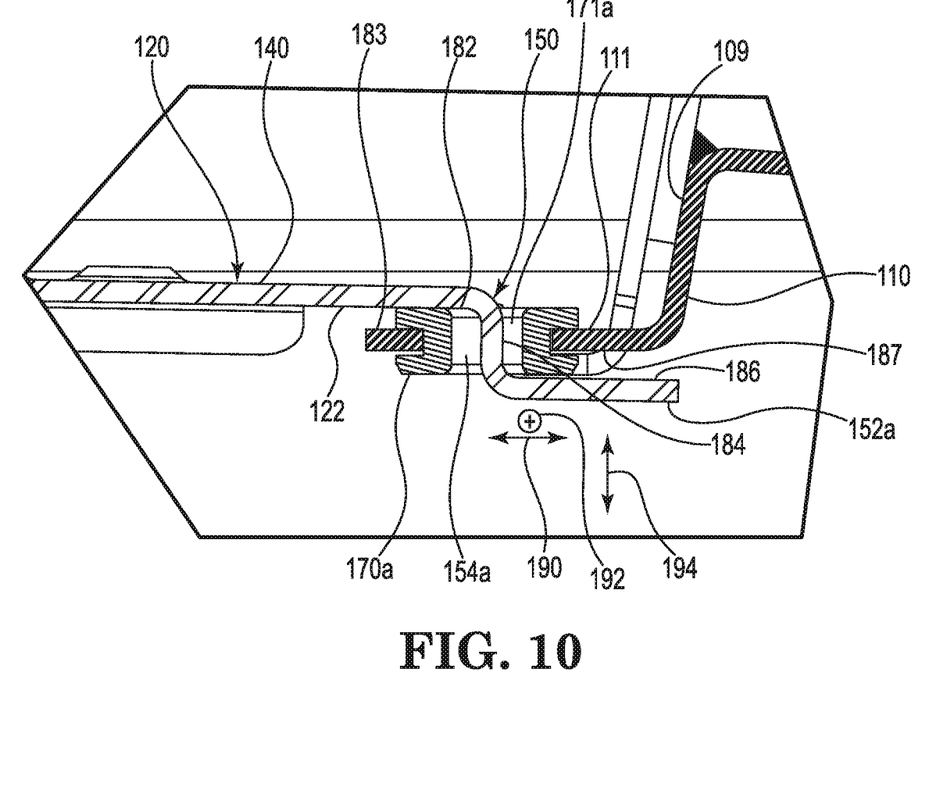
FIG. 10 is an enlarged view of the left rear isolator shown in FIG. 8.

With reference now to FIGS. 4, 8 and 10 (the latter being an enlarged view of a portion of FIG. 8), the support platform 120 may be retained by the chassis 110 by initially engaging the tabs 152*a*, 152*b* with the openings 154*a*, 154*b*, respectively. In some embodiments, one of the tabs (e.g., tab 152*a*) may include an ear 153 as shown in FIG. 4. The ear 153 may further assist in retaining the tab 152*a* within the opening 154*a*, e.g., when the support platform is in the vertical service position.

In one embodiment, the openings 154*a*, 154*b* may be formed in a chassis surface, i.e., "chassis plate 111" (see FIG. 10) that extends in a generally horizontal direction, e.g., is generally parallel with the floor portion 140 when the support platform 120 is joined to the chassis and in the normal operating position. In other embodiments, the openings 154*a*, 154*b* could be formed in a surface of the chassis (e.g., surface 109 shown in FIG. 10) that is generally perpendicular to the floor portion 140.

As described above, each of the retainers 150 may be embodied as a tab 152, wherein each tab (alone or in combination with the floor portion 140) may define a Z-shaped member when viewed from the side (or in cross-section) as shown in FIG. 10. That is, each of the tabs 152 may include a first or upper tab portion 182 (which may actually be formed by a part of the floor portion 140), a second or lower tab portion 186, and an intermediate tab portion 184 extending between the upper and lower tab portions. When the platform 120 is joined to the chassis as shown in FIG. 10, the intermediate tab portion 184 of each of the tabs 152 may extend through its opening 154/171 such that the upper tab portion 182 is positioned above a top surface 183 of the chassis plate 111 (and extends forward of the opening), and the lower tab portion 186 is positioned beneath a bottom surface 187 of the chassis plate (and extends rearward of the opening, i.e., towards the rear of the chassis). In one embodiment, the upper and lower tab portions 182, 186 may be parallel to each other as shown in FIG. 10. However, such a configuration is not limiting, i.e., other embodiments may utilize upper and lower tab portions that extend at different angles relative to one another. For example, the lower tab portion 186 in FIG. 10 could alternatively extend rearward and downward at an angle of, for example, 30 degrees from horizontal without departing from the scope of this disclosure.

As illustrated in FIG. 10, each rear isolator 170 (see 170*a* in FIG. 10) may form a grommet that covers not only the inner periphery (fore-and-aft and left-and-right interior surfaces) of its opening 154, but also covers a portion of the top and bottom surfaces 183, 187 of the chassis plate 111 immediately adjacent the opening. As a result, the rear isolators 170 isolate the platform 120 relative to the chassis 110 in each of: the fore-and-aft directions 190; the left-and-right directions 192; and the vertical up-and-down directions 194.

To join the support platform 120 the chassis 110 of the mower 100, the operator may grasp the platform and hold it so that the floor portion 120 (see FIG. 4) is oriented generally vertical. The ear 153 of the tab 152 may then be inserted into the opening 154*a* and the platform 120 slid, to the left, thereby seating the ear underneath the chassis plate 111. The tab 152*b* may then enter the opening 154*b*. At this point, the forward portion of the platform may be lowered (i.e., the footrest portion 130 may be moved towards the forward isolators 160). During this movement, the intermediate portion 184 (see FIG. 10) of each tab 154 may drop into its respective opening 154. Further movement may cause the lower surface 122 of the platform 120 to rest against the contact surface 165 of each of the forward isolators 160 as shown in FIGS. 6 and 7. Moreover, the tabs 152 will seat and rest upon the rear isolators 170 as shown in FIGS. 8 and 10.

If the platform 120 is not properly aligned during movement (e.g., from the vertical service position (not shown) to the normal operating position of FIG. 1), one of the side surfaces 124 (see, e.g., surface 124*b* of FIG. 7) of the platform may contact the frustoconical surface 164 of one of the forward isolators. Due to the corresponding shapes of the surfaces 124 and 164, this contact may cause the platform to re-align side-to-side toward the normal operating position.

During mower operation, forces may act on the platform that cause it to shift along or about: the longitudinal axis; a transverse axis; or a vertical axis. However, the forward isolators 160 may absorb downward vertical movement, and may resist all but minimal movement in the longitudinal and transverse directions as the frustoconical surface 164 will eventually bear against the side surface 124 (see FIG. 7), the front surfaces 125 (see FIG. 9), or the rear surfaces 127. Moreover, any such motion may also be restrained at the rear isolators 170 by the platform bearing against the isolator for vertical (up-and-down), transverse (left-and-right), and longitudinal (fore-and-aft) movement.

As one can appreciate, isolator systems like embodiments described herein may eliminate or substantially reduce contact of the platform with any structure other than the isolators. As a result, effective vibration/force and noise attenuation may be achieved.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A turf maintenance vehicle comprising:
a chassis comprising a front end and a rear end, the rear end spaced-apart from the front end along a longitudinal axis of the vehicle;
a support platform retained by the chassis, the support platform comprising a footrest portion and a floor portion located aft of the footrest portion, wherein either the chassis or the floor portion comprises a tab protruding from the chassis or the floor portion, respectively, and the other of the chassis or the floor portion defines an opening adapted to receive therein the tab when the support platform is joined to the chassis, wherein the tab defines, in cross section, a Z-shaped member, wherein a first tab portion of the Z-shaped member is positioned above a first surface of the chassis and a second tab portion of the Z-shaped member is positioned below a second surface of the chassis when the tab is received in the opening;
elastomeric first and second forward isolators positioned between the chassis and the support platform at or near the footrest portion; and
an elastomeric rear isolator also positioned between the chassis and the support platform at or near the floor portion, the rear isolator comprising a grommet positioned along a periphery of the opening.

2. The vehicle of claim 1, wherein the forward and rear isolators are adapted to:
locate the support platform, relative to the chassis, along longitudinal, transverse, and vertical directions; and
attenuate vibration transmitted from the chassis to the support platform.

3. The vehicle of claim 1, wherein the opening is formed in a chassis plate of the chassis, the chassis plate parallel to the floor portion of the support platform.

4. The vehicle of claim 1, wherein the first and second tab portions of the Z-shaped member are parallel to each other.

5. The vehicle of claim 1, wherein the second tab portion of the Z-shaped member extends from an intermediate tab portion towards the rear end of the chassis when the tab is received within the opening.

6. The vehicle of claim 1, wherein the first and second forward isolators each comprise a frustoconical surface.

7. The vehicle of claim 1, wherein each of the first and second forward isolators is positioned near a forwardmost end of the footrest portion of the support platform when the support platform is joined to the chassis and in a normal operating position.

8. The vehicle of claim 1, wherein the rear isolator is positioned near a rearmost end of the floor portion of the support platform when the support platform is joined to the chassis.

9. The vehicle of claim 1, further comprising a second, elastomeric rear isolator positioned between the chassis and the support platform at or near the floor portion.

* * * * *